United States Patent
Sznajder et al.

(10) Patent No.: US 7,895,232 B2
(45) Date of Patent: Feb. 22, 2011

(54) OBJECT-ORIENTED TWIG QUERY EVALUATION

(75) Inventors: Benjamin Sznajder, Jerusalem (IL); Dafna Sheinwald, Nofit (IL); Sivan Yogev, Givat Haim Meuchad (IL)

(73) Assignee: International Business Machines Corporation, Armonk, NY (US)

( * ) Notice: Subject to any disclaimer, the term of this patent is extended or adjusted under 35 U.S.C. 154(b) by 459 days.

(21) Appl. No.: 11/964,017

(22) Filed: Dec. 25, 2007

(65) Prior Publication Data

US 2009/0164424 A1 Jun. 25, 2009

(51) Int. Cl.
G06F 17/30 (2006.01)

(52) U.S. Cl. .................................. 707/775
(58) Field of Classification Search ............. 707/718, 707/775
See application file for complete search history.

(56) References Cited

U.S. PATENT DOCUMENTS

| | | | |
|---|---|---|---|
| 5,809,502 A | 9/1998 | Burrows | |
| 5,864,863 A * | 1/1999 | Burrows | 1/1 |
| 5,978,789 A * | 11/1999 | Griffin et al. | 1/1 |
| 6,067,543 A * | 5/2000 | Burrows | 1/1 |
| 6,081,774 A * | 6/2000 | de Hita et al. | 704/9 |
| 6,094,648 A * | 7/2000 | Aalbersberg | 1/1 |
| 6,411,951 B1 * | 6/2002 | Galindo-Legaria et al. | 1/1 |
| 6,439,783 B1 * | 8/2002 | Antoshenkov | 1/1 |
| 6,732,094 B1 * | 5/2004 | Cousins et al. | 1/1 |
| 6,778,988 B2 * | 8/2004 | Bengtson | 1/1 |
| 6,834,286 B2 * | 12/2004 | Srinivasan et al. | 1/1 |
| 6,918,124 B1 * | 7/2005 | Novik et al. | 719/318 |
| 6,964,013 B1 * | 11/2005 | Ono et al. | 715/207 |
| 7,162,485 B2 * | 1/2007 | Gottlob et al. | 1/1 |
| 7,596,548 B2 * | 9/2009 | Josifovski et al. | 1/1 |
| 2003/0237048 A1 * | 12/2003 | Jones et al. | 715/513 |
| 2004/0049499 A1 * | 3/2004 | Nomoto et al. | 707/3 |
| 2004/0243645 A1 * | 12/2004 | Broder et al. | 707/200 |
| 2005/0021548 A1 * | 1/2005 | Bohannon et al. | 707/101 |
| 2006/0053122 A1 * | 3/2006 | Korn et al. | 707/100 |
| 2007/0033165 A1 | 2/2007 | Sheinwald | |
| 2007/0112763 A1 | 5/2007 | Broder | |
| 2007/0255698 A1 * | 11/2007 | Kaminaga et al. | 707/3 |
| 2009/0006329 A1 * | 1/2009 | Cong et al. | 707/3 |

OTHER PUBLICATIONS

Broder et al., Efficient Query Evaluation using a Two-Level Retrieval Process, 2003.*
Carmel et al., Searching XML Documents via XML Fragments, 2003.*

(Continued)

*Primary Examiner*—James Trujillo
*Assistant Examiner*—William Spieler

(57) ABSTRACT

A computer-implemented method for searching a corpus of documents includes defining a query as a twig including a root annotation operator having an associated tag specifying a span and having an associated expression indicative of one or more terms whose occurrence within the span will satisfy the query. An object is recursively selected from a group of objects that consists of the tag and the expression, and is used in advancing through the corpus until a candidate document is found that contains the tag and satisfies the expression. The candidate document is evaluated to determine whether the one or more terms indicated by the expression occur within the span in the candidate document so as to satisfy the annotation operator.

20 Claims, 4 Drawing Sheets

OTHER PUBLICATIONS

Wouter Alink et al., "Representing and Querying Multi-dimensional Markup for Question Answering" (Source: http://pathfinder-xquery.org/files/multi-dim-markup-nlpxml2006.pdf).

Niraj Aswani et al., "Indexing and Querying Linguistic Metadata and Document Content" (Source: http://gate.ac.uk/sale/ranlp05/ranlp05-annic.pdf).

I.E. Iacob et al, "Processing XML Documents with Overlapping Hierarchies" (Source: http://www.iee-tcdl.org/Bulletin/v2n1/iacob/iacob.html).

I.E. Iacob et al., "Towards a Query Language for Multihierarchical XML: Revisiting Xpath", 2005 (Source: http://webdb2005.uhasselt.be/papers/3-3.pdf).

Patrick Durusau et al., "Tabling the Overlap Discussion" (Source: http://www.idealliance.org/papers/extreme/proceedings/html/2004/Durusau01/EML2004Durusau01.html).

Mass et al., "XML Fragments Extended with Database Operators," *RIAO-2007 Large-Scale Semantic Access to Content* (*Text, Image, Video and Sound*), Pittsburgh, Pennsylvania, May 2007.).

\* cited by examiner

OBJECT-ORIENTED TWIG QUERY EVALUATION

FIELD OF THE INVENTION

The present invention relates generally to methods and systems for searching a corpus of documents, and specifically to efficient methods for evaluating complex queries over such a corpus.

BACKGROUND OF THE INVENTION

The amount of data available for search continues to grow rapidly. At the same time, users have come to expect their search engines to provide rapid response and accurate results regardless of the complexity of the queries that they pose.

A variety of query processing strategies are known in the art. For large corpora of data, an object-oriented document-at-a-time (DAAT) approach is widely used. This sort of approach is described, for example, by Burrows in U.S. Pat. No. 5,809,502. The index (often referred to in the art as an "inverted index") to a collection of documents is organized as a plurality of index entries, wherein each index entry comprises a word and an ordered list of locations where the word occurs in the collection. The index entries are ordered first according to the documents in the collection, and second according to the locations of each associated word within the document.

A query is parsed into terms and operators. Each term is associated with a corresponding index entry, while the operators relate the terms. A basic stream reader object is generated for each term of the query. The basic stream reader object sequentially reads the locations of the corresponding index entry to determine a target location. A compound stream reader object is generated for each operator. The compound stream reader object references the basic stream reader objects associated with the terms related by the operator. The compound stream reader object returns locations of words within a single document according to the operator.

Sheinwald et al. describe a DAAT method for searching a corpus of documents in U.S. Patent Application Publication 2007/0033165, whose disclosure is incorporated herein by reference. A query processor receives a complex query, which includes a plurality of words conjoined by operators including a root operator and at least one intermediate operator. Respective advancement potentials are assigned to the words in the complex query. The query processor applies a consultation method to the words and operators in the complex query in order to choose one of the words responsively to the advancement potentials. The query processor then advances through the index in order to find a document containing the chosen word, and evaluates the document to determine whether the document satisfies the complex query.

Methods are known in the art for automatically annotating and indexing documents. For example, Aswani et al. describe such a method in "Indexing and Querying Linguistic Metadata and Document Content," *Proceedings of Fifth International Conference on Recent Advances in Natural Language Processing (RANLP*-2005), 2005. This paper presents the ANNIC system, which can index documents not only by content, but also by their linguistic annotations and features. It is said to enable users to formulate queries mixing keywords and linguistic information. The result consists of the matching texts in the corpus, displayed within the context of linguistic annotations.

A variety of tools are available for automatic semantic and linguistic tagging of documents. For example, the Unstructured Information Management Architecture (UIMA) developed by IBM Corporation (Armonk, N.Y.) is an open platform for creating, integrating and deploying unstructured information management solutions from combinations of semantic analysis and search components. It allows easy authoring of annotators, such as the expression of the format of telephone numbers, or dates, or meeting rooms. Then, given a set of text documents, the UIMA tool applies the various annotators authored, thereby automatically annotating segments of text by different annotations as authored. IBM product platforms that expose the UIMA interfaces include the OmniFind Enterprise Edition and Analytics Edition. The former features UIMA for building full-text and semantic search indexes, and the latter deploys UIMA for information extraction and text analysis. Further information regarding UIMA is available on the IBM Research Web site (www.research.ibm.com/UIMA/).

SUMMARY OF THE INVENTION

An embodiment of the present invention provides a computer-implemented method for searching a corpus of documents. A query is defined as a twig, which includes a root annotation operator having an associated tag. The tag specifies a span and has an associated expression indicative of one or more terms whose occurrence within the span will satisfy the query. Objects, which may be a tag or an expression, are recursively selected and used in advancing through the corpus until a candidate document is found that contains the tag and satisfies the expression. The candidate document is then evaluated to determine whether the one or more terms indicated by the expression occur within the span in the candidate document so as to satisfy the annotation operator. The candidate document may be retrieved from the corpus upon determining that the annotation operator is satisfied.

The present invention will be more fully understood from the following detailed description of the embodiments thereof, taken together with the drawings in which:

DETAILED DESCRIPTION OF EMBODIMENTS

Overview

Figure 1:
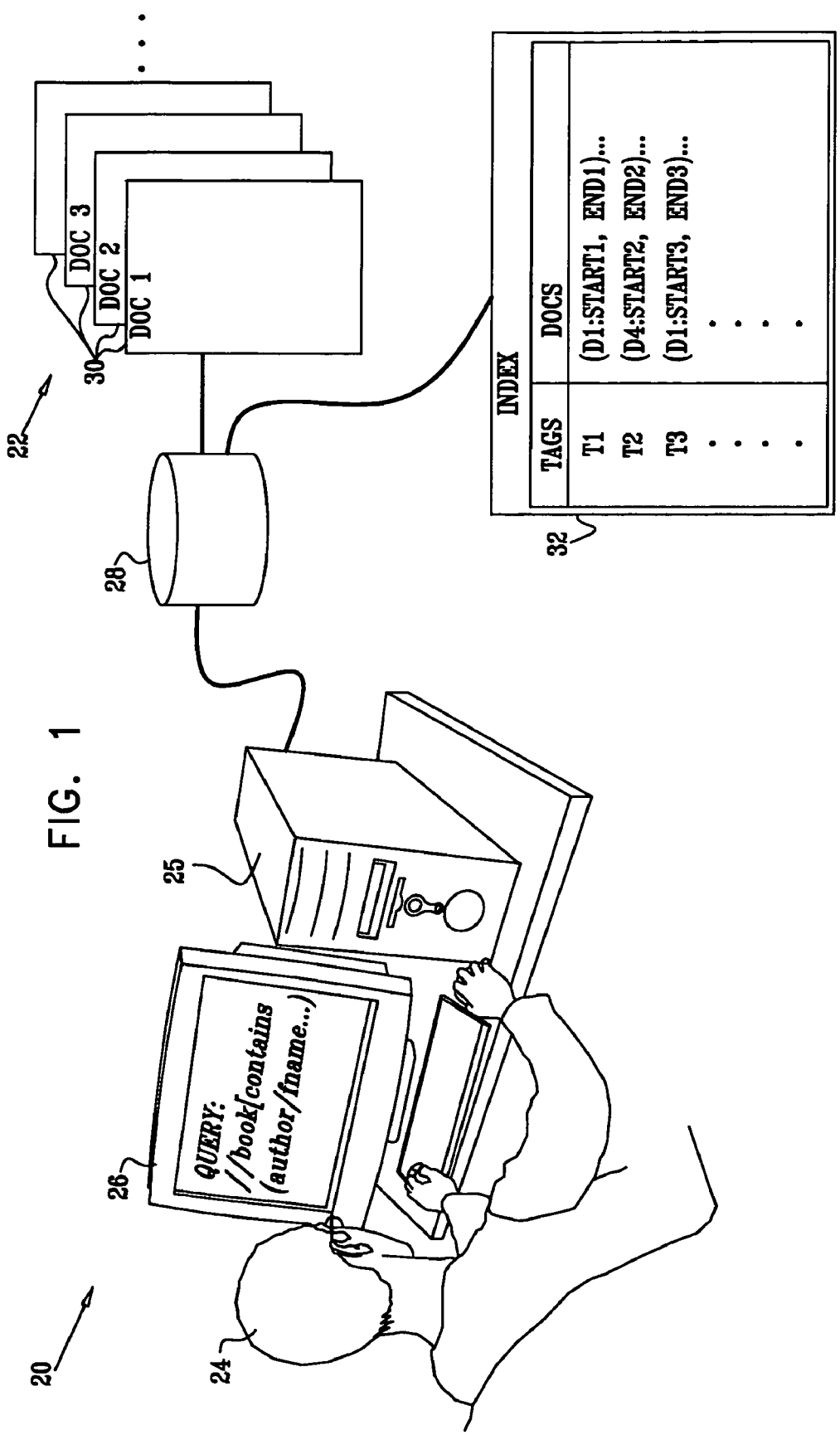
FIG. 1 is a schematic, pictorial illustration of a system for query evaluation, in accordance with an embodiment of the present invention.

As noted earlier, search engines typically index text documents into an "inverted index," which includes a "postings list" for each term. One example of such a search engine is the Lucene open source text search library (Apache Software Foundation, www.apache.org). A "term" in this context may be a text word or a tag containing meta-information about a certain span of text, such as an Extensible Markup Language (XML) element or an annotation. The postings list for term t contains a postings element of the form <docID, position, payload> for each occurrence of t in the collection of indexed documents. This element specifies (1) the ordinal number of the document in the corpus; (2) the (starting) position of the term within that document; and (3) extra information, which specifies whether the term occurrence is part of a page title, appears in bold, etc., or, if the term is a tag, the end of the span defined by the tag. The postings elements are sorted in the index by docID, and within each document by (starting) position.

The index provides an "iterator" over the postings list, which exposes the methods doc( ), start( ), and end( ) of the current postings element that it visits, as well as the methods next( ), by which the iterator advances to the next posting in the list, and next(doc:pos), by which it advances to the first posting of location≧doc:pos.

In response to a query, the search engine grabs the postings lists of all the query terms and iterates over all the documents that satisfy the query (referred to as "hits"). The search engine also scores each hit by some formula that typically combines the specifics of the query term occurrences in each document with the weight of each such occurrence. (This scoring, however, is beyond the scope of the present invention.) For a simple query, like "IBM," the search engine grabs the postings list of the text term "IBM" and readily iterates, using its next method, over all the hits, i.e., the documents that contain an occurrence of the word "IBM."

For a phrase query, like "big blue," the search engine grabs the postings lists of term "big" and of term "blue," and it iterates on both, identifying documents that include the terms in two consecutive positions. This orchestration of both iterators (or more, depending on the length of the phrase) is typically implemented via an object that extends the basic iterator. Although this object does not have a postings list of its own, it still exposes doc( ), start( ), end( ), next( ) and next(doc:pos) for the occurrences of the phrase within the indexed documents. Further compound iterators for iterating over hits for composite queries can be built using similar techniques to combine sub-queries into a larger query: OR, AND, PHRASE. The above-mentioned U.S. Patent Application Publication 2007/0033165 describes a method in which each parent node in a query twig asks its children to explore the possibility of their occurrences and thus minimizes the number of basic next operations. This sort of method is referred to herein as "Investigate Possible Occurrence" (IPO).

In the embodiments of the present invention that are described hereinbelow, an annotation operator, referred to herein below as "ANNOTATES," is used in queries to operate on tags in a corpus of documents. These tags may include, for example, XML elements or semantic annotations, as well as other types of meta-information identifiers that are known in the art. Each tag defines a span, having a "start" and an "end," which specify the positions of the first and last text terms, respectively, of the text segment covered by a given occurrence of the tag. For each tag name in the collection, the index contains a postings list of entries consisting of the triple <docID, start, end>.

A query in the corpus may be defined as a twig comprising a root annotation operator, which has, associated as operands, a tag name and possibly an expression indicative of one or more terms whose occurrence within the span of an occurrence of the tag operand will satisfy the query. The expression typically comprises one or more intermediate operators that define relations between the terms, wherein the intermediate operators may themselves be annotation operators with their own operands. The query may be satisfied when the expression operand of the root occurs within the span of an occurrence of the tag operand of the root.

In embodiments of the present invention, however, span occurrences in the document, of any tags, may cross over one another, and are not limited to being disjoint or included (nested) within one another. (By contrast, in XML documents, for example, spans of tag occurrences (known in the XML literature as "elements") are strictly nested, and hence the spans of any two tag occurrences either include one another, or totally exclude one another.) Additionally or alternatively, multiple occurrences of an intermediate operator may be found, all occurring within the same span occurrence of the tag operand of the parent annotation operator.

In response to the query, a query processor searches the corpus by recursively selecting either the tag or the expression of the root annotation operator and any intermediate annotation operators. The processor advances through the corpus using the selected object until a candidate document is found that contains the tag and satisfies the expression in question. The processor then evaluates the candidate document to determine whether the terms indicated by the expression occur within the appropriate span in the candidate document so as to satisfy the root annotation operator. If so, the candidate document is marked as a "hit" and may typically be retrieved from the corpus. The query processor may mark all of the occurrences of the words and tags in the document that satisfy the query.

Thus, to summarize, the methods described herein are capable of dealing with non-nested annotations on documents, and can find an occurrence, or all the occurrences, of a twig query within a document in substantially any pattern of annotations. These methods operate, as described hereinbelow, in an object-oriented manner, in which the different nodes of the query twig "negotiate" with one another to identify the next basic iterator to advance on its postings list. Such methods speed up search performance by avoiding unnecessary moves over the postings lists, which often require time-consuming disk-access operations.

System Description

FIG. 1 is a schematic, pictorial illustration of a system 20 for querying a corpus 22 of information, in accordance with an embodiment of the present invention. Typically, a user 24 inputs a query to a query processor 25 via a user interface 26, which comprises an input interface device, such as a keyboard, and an output interface device, such as a display monitor. Alternatively, the query may be input via another type of interface, such as a network communication interface (not shown). Corpus 22 comprises multiple documents 30, which are stored in storage media, such as a disk 28. (Typically, the documents in large corpora, such as the World Wide Web or an enterprise data system, may be stored in a number of different storage devices, which are distributed among different locations, but only a single disk is shown in FIG. 1 for the sake of simplicity.) Documents 30 may comprise substantially any sort of data files or records known in the art, ranging from books and articles, to Web pages, to database records, for example. Each document has a unique document identifier number (docID).

Prior to indexing, documents 30 may be annotated automatically with tags, such as tags identifying the beginning and end of particular semantic elements in the text.

In evaluating queries, processor 25 uses an inverted index 32, which is typically stored on disk 28. The index comprises a postings list for each term appearing in corpus 22. As explained above, each term may be a word, i.e., a certain string of characters (not necessarily a natural language word) or a tag (such as an XML element or semantic annotation). Each item in the postings list for a term t specifies a location of a single occurrence of t in the corpus. The location is typically specified in the form <docID, position, payload>, as explained above. The postings in index 32 are generally sorted in order of docID and in order of position among multiple occurrences of a term in one document. Index 32 supports a postings iterator, or cursor, providing a method next(1), which advances to the first element in the postings list for a selected term with location≧1.

Processor 25 evaluates the query against index 32 in order to find documents 30 containing all the terms of the query in the proper alignment. The method used by the processor for this purpose is described hereinbelow with reference to FIG. 4. Typically, the processor retrieves the documents that satisfy the query and then outputs the documents (or relevant parts of the documents) via user interface 26.

Processor 25 may comprise a general-purpose computer, which is programmed in software to carry out the functions described in this patent application. This software may be downloaded to processor 25 in electronic form, over a network, for example, or it may alternatively be stored on tangible media, such as magnetic, optical, or non-volatile electronic memory media. Further alternatively, some of the functions of processor 25 may be performed by dedicated hardware circuits.

Figure 2:
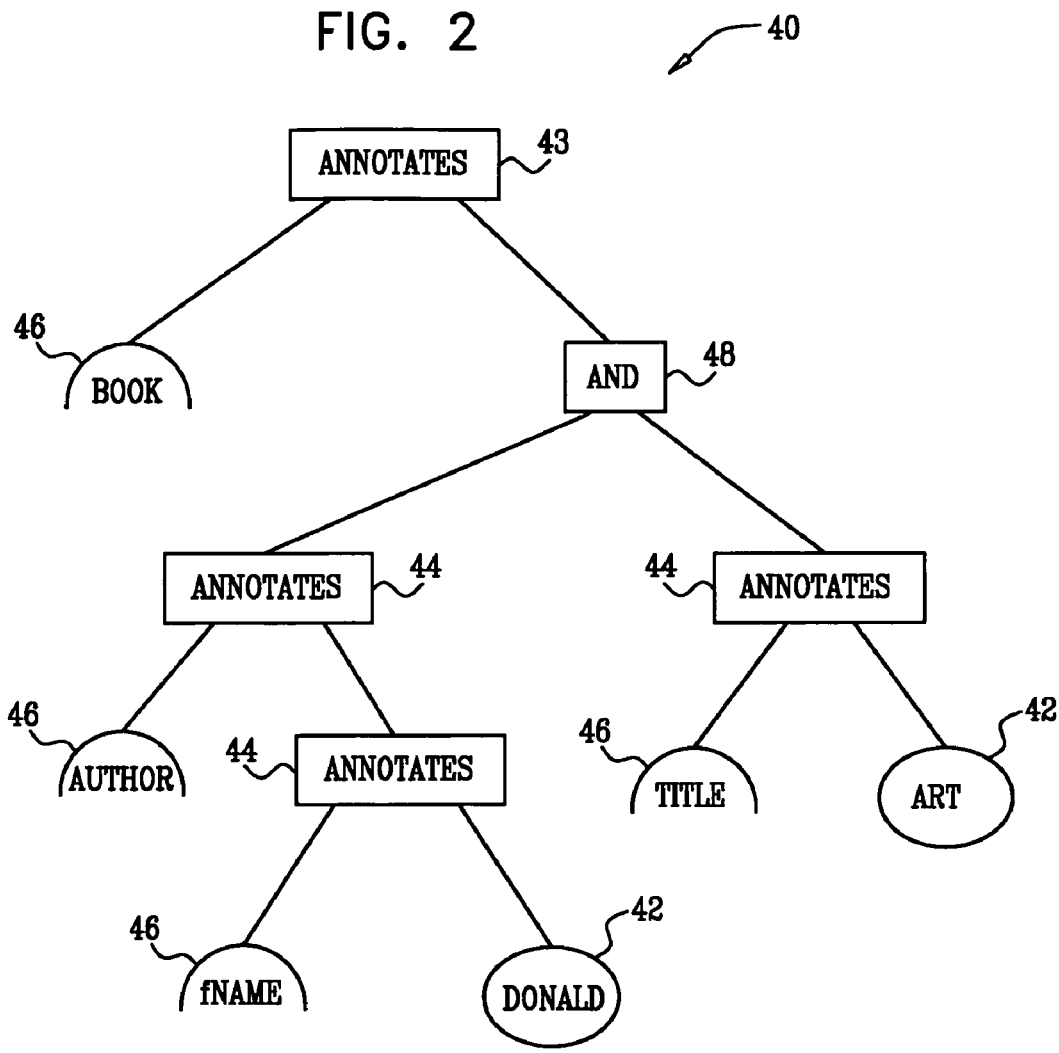
FIG. 2 is a graph that schematically illustrates a twig query, in accordance with an embodiment of the present invention.

FIG. 2 is a graph 40 that schematically illustrates a twig query, in accordance with an embodiment of the present invention. This query may be represented in the common XPath form as:

//book[contains(author/fname, "Donald") AND contains(title, "Art")]

(XPath [XML Path Language] is an expression language for addressing parts of an XML document, as specified in a W3C® Recommendation dated Jan. 23, 2007, available at www.w3.org/TR/xpath20.) To satisfy the above query, a qualifying document should contain an occurrence of the text word "Donald" as part of a text segment tagged by fName, and that text segment should be a part of a (possibly larger) text segment tagged by author, which in turn belongs to a larger tag named book, which also includes an occurrence of the tag title that includes an occurrence of the text word "Art". The same query may be expressed in the form of an XML-Fragment as:

```
<book>
    <author> <fName> Donald </fName> </author>
    <title> Art </title>
</book>
```

(XMLFragments are described by Mass et al. in "XML Fragments Extended with Database Operators," *RIAO*-2007 *Large-Scale Semantic Access to Content* (*Text, Image, Video and Sound*), Pittsburgh, Pa., May, 2007.)

Graph 40 comprises a root node 43, intermediate nodes 44, 48, and leaves 42, 46. The leaves include text word leaves 42 and tag name leaves 46. Each leaf (text word or tag name) in the query twig has a postings list. Tags, illustrated by half circles, have extended posting elements, which use the payload for specifying end. Root node 43 and each intermediate node 44, 48 is associated with an operator that connects the children of the node. In this example, node 48 is associated with the logical conjunction operator AND. The remaining nodes are associated with the annotation operator ANNOTATES.

Operator ANNOTATES has two children, the left being a tag (such as an annotation or an XML element), and the right being a text word or a subquery rooted by another operator. ANNOTATES represents the inclusion operator: its left child has to include its right child. Thus, in the example shown in FIG. 2, the word "Art" should be included within a text annotated title, and the annotation fName should all be included within a text annotated author in the document.

Processor 25 recursively determines whether a given document doc satisfies a twig query q: doc satisfies a leaf of q if doc includes an occurrence of the term associated with the leaf. doc satisfies a node of q if doc satisfies children of the node in accordance with the operator associated with the node. doc satisfies q if doc satisfies the root of q.

The query twigs described herein are assumed to be rooted by an ANNOTATES node. In searching these queries, processor 25 uses an iterator for an ANNOTATES node that exposes the appropriate next methods, as described hereinbelow. In cases in which either AND or OR roots the query twig, the processor can use the ANNOTATES iterator for any intermediate ANNOTATES nodes that are not descendants of other ANNOTATES nodes, as though these ANNOTATE nodes were themselves root nodes of their respective subqueries. The processor uses the ANNOTATES iterator together with other iterators born from the query, as it does for any combination of operators in a boolean query.

Although documents 30 are not all hierarchically structured, since tag spans may overlap without being nested, the queries applied by processor 25 may still be hierarchical, as illustrated by graph 40. Furthermore, the ANNOTATES operator may be extended to support non-hierarchical structures as well, by allowing, for example, the expression of intersections of annotations.

Figure 3:
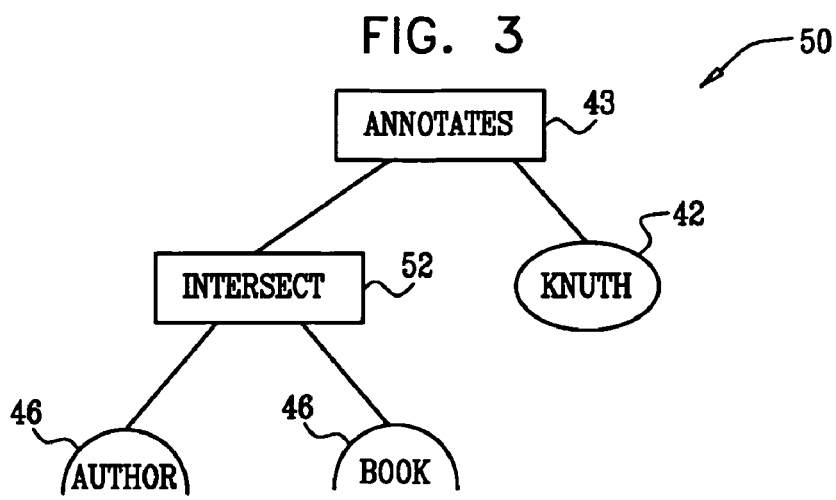
FIG. 3 is a graph that schematically illustrates another twig query, in accordance with an embodiment of the present invention.

FIG. 3, for instance, is a graph 50 that schematically illustrates a twig query containing an INTERSECT node 52, in accordance with an alternative embodiment of the present invention. This query could be expressed as the XMLFragment: <author * book> Knuth </author * book>, meaning: find documents that include an occurrence of word "Knuth" annotated by both book and author. Such a query can come in handy for users who are not aware of the hierarchy of annotations in the corpus: whether book annotations include author annotations, or the other way around, or whether these annotations may cross over, i.e., overlap without nesting.

Searching Queries with Annotation Operators

Figure 4:
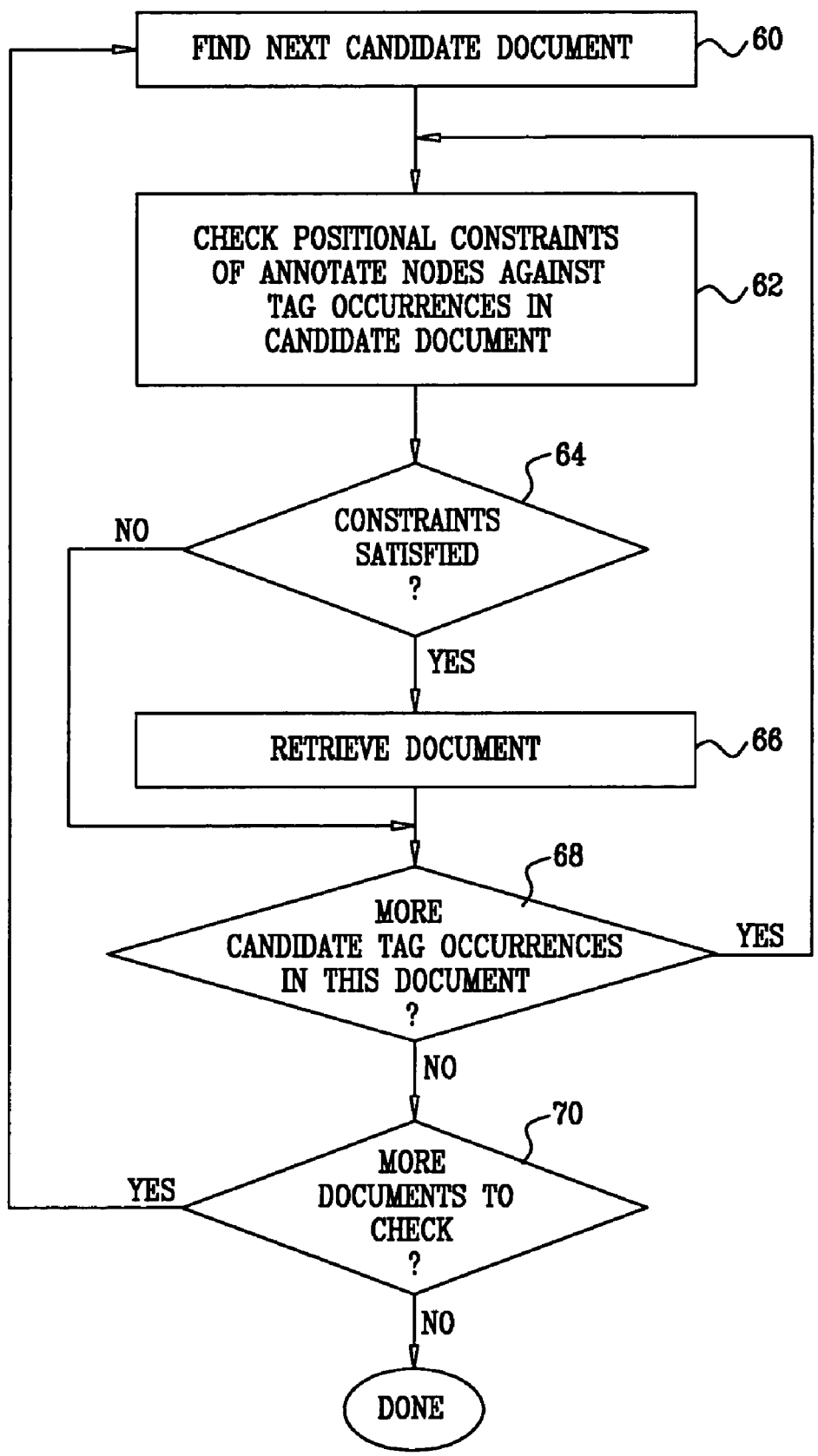
FIG. 4 is a flow chart that schematically illustrates a method for query evaluation, in accordance with an embodiment of the present invention.

FIG. 4 is a flow chart that schematically illustrates a method for query evaluation, in accordance with an embodiment of the present invention. The method will first be described in general terms, followed by a detailed description, including pseudocode listings, of the particular algorithms that may be used in carrying out the steps of the method. The method is described, for the sake of convenience, with reference to the elements of system 20 (FIG. 1), but it may equally be applied by any suitably-configured search engine.

After receiving an input twig query, processor 25 begins to iterate through index 32 until it finds a candidate document, at a candidate finding step 60. A document is considered a candidate if it contains all of the terms in the query, including both words and tags. At this stage, the processor uses the IPO method (Investigate Possible Occurrence) to locate the candidate documents.

Upon finding a candidate document, the processor then checks whether this document satisfies the positional constraints imposed by the annotation operators, at an alignment checking step 62. For this purpose, the processor compares the locations of the words in the query with the spans of the tags associated with the lower-level intermediate nodes that are supposed to contain these words, and then works upward recursively through the twig until it reaches the root node. The processor checks whether all of the constraints expressed by the twig query are satisfied by a given set of occurrences of the words in the query, at a satisfaction checking step 64. If so, the processor may retrieve the candidate document, at a document retrieval step 66. Alternatively or additionally, the processor may take other action, such as storing the query results.

In some cases, user 24 may ask not only to receive the documents that satisfy the query, but also to have processor 25 identify the occurrences of the particular term occurrences in each document that satisfy the query. In some cases, there may be multiple such occurrences in a single document. If the user wishes (by explicit choice or by default) to see all such occurrences, the processor may continue checking each candidate document even after finding the first occurrence of terms that satisfy the query, at an additional occurrence checking step 68. If the processor determines that there may still be further satisfying occurrences, it iterates back through step 62 until all of the occurrences have been found.

After completing the processing of a given document at step 64, 66 or 68, the processor ascertains whether there are further documents remaining to be checked in corpus 22, at a further document checking step 70. If so, the processor returns to step 60 and repeats the operations described above. Otherwise, the search terminates, and the processor notifies the user that the search has been completed.

Investigate Possible Occurrence (IPO)

Method IPO serves as the basis for processing twig queries rooted by ANNOTATES at steps 60 and 62. The twig nodes use it in order to decide, collectively and recursively over the query twig, which is the best postings list to advance on next. This method is based generally on the techniques described in the above-mentioned U.S. Patent Application Publication 2007/0033165 and may be extended with additional features described in this publication.

n.-IPO(docid) returns the status of the possibility for the subtwig rooted by node n to occur in document docid, along with a piece of information, info, relevant to that status. status can take one of three possible values: YES, POSSIBLY, or NO, which together with the associated info mean:

status=YES if the current positions of the query term iterators induce an occurrence of the subtwig rooted by n within docid. The value of info here is irrelevant.

status=POSSIBLY if, by their current positions, none of the iterators of the leaf descendants of n is in a position to exclude an occurrence of the subtwig rooted by n within docid, but they do not suffice to fully verify such an occurrence yet. In such a case, info specifies the leaf t of n of lowest document frequency among the leaves that are yet to advance into docid, in order to possibly verify the occurrence of the subtwig rooted by n there.

status=NO if at least one leaf descendant of n has its iterator in a position that prevents a future occurrence (by the leaves using their next method) of the subtwig rooted by n within docid. In this case, info specifies the smallest docID (which is still>parameter docid) for a possible occurrence of the subtwig rooted by n.

IPO enables a round of hierarchical negotiations, during which none of the leaf terms moves on its postings list, but rather all nodes together identify the best leaf to make the next move. The leaf thus identified then invokes its next(targetID: 0), with targetID≧docid determined in conjunction with the leaf identification. The whole process then repeats for the new arrangement of current locations of the leaves.

The following are sample implementations of IPO for different types of nodes in the query twig. Since each leaf is associated with a basic iterator, it can identify the document containing the current term occurrence visited by the iterator, which we denote by this.doc( ). It can also identify the start of this current occurrence—this.start( ), and its end—this.end( ). We also assume that the document frequency, or its inverse, denoted idf, is available to the leaf from the index, and we denote it here by this.idf( ).

Method IPO for a leaf node is presented below:

LISTING I - IPO FOR LEAF NODES

```
1. (status, info) term::IPO(docID)
2.     if this.doc( ) = docID return (YES, N/A)
3.     if this.doc( ) > docID return (NO, this.doc( ))
4.     /* this.doc( ) < docID */
5.     return (POSSIBLY, this)
```

If occurrence of the relevant terms is still possible for an AND node, the processor selects the highest idf among those terms selected by the children as their best choices. If any child has already reached beyond docid, the furthest of these children sets the earliest document possible for an occurrence of this AND node. The implementation is shown below in Listing II, wherein $n_i$ denotes children of this AND node:

LISTING II - IPO FOR AND NODES

```
1. (status, info) AND::IPO(docID)
2.     for n_i child of this
3.        (status_i, info_i) <- n_i.IPO(docID)
4.     if for all i, status_i=YES, return (YES, N/A)
5.     if for any i, status_i=NO
6.        return (NO, max_i:status_i=NO {info_i})
7.     bestOperand <- arg max_i:status_i=POSSIBLY
                {info_i.idf( )}
8.     return (POSSIBLY, info_bestOperand)
```

By definition of OR, exclusion of a document by one child does not allow other children to skip over it as well. For coherence, an OR node, too, selects its highest idf leaf descendant first. The implementation is shown below:

LISTING III - IPO FOR OR NODES

```
1. (status, info) OR::IPO(docID)
2.     for n_i child of this
3.        (status_i, info_i) <- n_i.IPO(docID)
4.     if for some i, status_i=YES, return (YES, N/A)
5.     if for all i, status_i=NO
6.        return (NO, min_i {info_i})
7.     bestOperand <- arg max_i:status_i=Possibly
                {info_i.idf( )}
8.     return (POSSIBLY, info_bestOperand)
```

None of the IPO routines list above yields any advancement on any postings list. The highest idf is selected with the aim of minimizing evaluation cost, in terms of number of next steps applied to the basic postings lists. In other words, the processor will recognize that a give node is not satisfied by docid with as few next iterations as possible.

Finding Candidate Documents to Satisfy a Twig Query

This section describes a technique that may be used by processor 25 at step 60 to find the next candidate document that contains occurrences of tags and words from a given twig query, twig, that is rooted by ANNOTATES. The leaves of twig, as explained above, represent either words or tags (annotation names or XML elements names), and the intermediate nodes of twig represent either AND, OR, or ANNOTATES. The procedure NextCandidateDoc( ), presented in Listing IV below, finds the next document that includes sufficient leaves to make an occurrence of twig possible, without determining whether the tags cover the terms that they are supposed to cover.

As a preliminary step, each Annotates is temporarily replaced by an AND node, so that NextCandidateDoc( ) only needs to process AND and OR internal nodes. NextCandidateDoc employs root.IPO(d), and responsively invokes the method next(location) of one of the terms. This process continues recursively at step 60 until the next document is identified that includes sufficient leaves to make an occurrence of twig possible. The method assumes that docID takes the values 1, 2, . . . , index-size<∞, position takes the values 0, 1, . . . , max-doc-size<∞, and that if next(doc:0) of a term t cannot find a document in the index that includes t with docID≧doc, then the next invocation of doc( ) for t returns ∞.

---

LISTING IV - FINDING NEXT CANDIDATE DOCUMENT

```
1.   NextCandidateDoc( )
2.     d <- 1
3.     (status, info) <- root.IPO(d)
4.     while (d <= index-size)
5.       if status = YES
6.         /* document d includes sufficient leaves to
               possibly satisfy the query */
7.         return document d
8.       else if status = NO
9.         /* d does not include sufficient leaves;
               earliest possible query occurrence is in
               document info */
10.        d <- info
11.      else /* status = POSSIBLY */
12.        /* d is still a candidate, advance one leaf
               and then check again */
13.        info.next(d : 0)
14.        (status, info) <- root.IPO(d)
        /* loop ends without finding a good document */
15.      return ∞
```

---

Checking Positional Constraints in a Candidate Document a) XML Documents

Having found a document doc at step 60 that includes sufficient leaves (words and tags) to allow an occurrence of the twig query twig, processor 25 now returns the ANNOTATES nodes to their places in the twig (instead of the AND nodes that replaced them temporarily), and checks whether doc satisfies the positional constraints of the ANNOTATES nodes at step 62. For this purpose, the processor uses an extension of the method IPO, presented below in Listing V, that works within one document. Now IPO receives three parameters: doc, from and to, which specify a range of term positions within document doc, and returns, as before, a (status, info) pair.

---

LISTING V - INTRA-DOCUMENT VERSION OF IPO FOR A LEAF NODE.

```
1.   (status, info) term::IPO(doc, from, to)
2.     if this.doc( ) > doc return (NO, this.doc( ) :
           this.start( ))
3.     if this.doc( ) < doc return (POSSIBLY, this)
4.     /* this.doc( ) = doc */
5.     if this.start( ) > to return (NO, this.doc( ) :
           this.start( ))
6.     if this.start( ) < from return (POSSIBLY, this)
7.     if this.start( ) >= from and this.end( ) <= to return
           (YES, N/A)
       /* term starts within input range
           but extends to beyond its end; can happen only
           for tag term */
8.     return (POSSIBLY, this)
```

---

The IPO methods for AND and OR that are given above in Listings II and III are modified in an analogous manner.

The method ANNOTATES::IPO(doc, from, to), as presented below in Listing VI, assumes that ANNOTATES has two children, as defined above: The left child is a leaf representing a tag, and the right child, if not null, is an intermediate node or a text term. A document doc is said to satisfy a subtwig rooted at ANNOTATES node n if doc includes an occurrence of the left child of n (which is a tag) in the range of which there is an occurrence of the sub-twig rooted at the right child of n. The method also assumes, for the present, that (1) it is necessary to determine only whether doc includes an occurrence of twig (rather than identifying all the occurrences of twig within doc), and (2) doc is a proper, well-nested, XML document. Under these conditions, the method presented in Listing VI generates the correct answer YES or NO as appropriate to indicate that a match has been or cannot be found in doc, or else returns POSSIBLY and suggests the correct leaf term to which the processor should advance in order to ensure that no match is missed.

---

LISTING VI - IPO FOR ANNOTATES NODES IN A WELL-NESTED DOCUMENT

```
1.   (status, info) ANNOTATES::IPO(doc, from, to)
2.     /* left and right are the children of this
           ANNOTATES node */
3.     (status_l, info_l) <- left.IPO(doc, from, to)
4.     if status_l = NO return (NO, info_l)
5.     if status_l = POSSIBLY return (POSSIBLY, left)
6.     /* status_l = YES */
7.     if right = null return (YES, N/A) /* ANNOTATES is
           allowed to only have left child */
8.     (status_r, info_r) <- right.IPO(doc, left.start( ),
           left.end( ))
9.     if status_r = YES return (YES, N/A)
10.    if status_r = NO
11.      if info_r > doc:to return (NO, info_r)
12.      else return (POSSIBLY, left)
13.    /* status_r = POSSIBLY */
14.    return (POSSIBLY, info_r)
```

---

The method FirstTwigInDoc( ), presented below in Listing VII, recursively orchestrates the IPO(doc, from, to) methods of the different node types and the next(doc) methods of the leaves (in analogy with NextCandidateDoc( ) of Listing IV), in order to find a twig occurrence, if such exists, in a candidate document doc. The method returns TRUE if a twig occurrence is found, i.e., if the positional constraints are met:

---
LISTING VII - VERIFICATION OF POSITIONAL CONSTRAINTS
---

```
1.   Boolean FirstTwigInDoc( )
2.   /* twig's root is an ANNOTATES node, whose children
        are left and right */
3.   /* because doc was found by NextCandidateDoc, it
        certainly contains left */
4.   while (left.start( ) < doc+1 : 0)
5.       (status, info) <- right.IPO(doc, left.start( ),
            left.end( ))
6.       while (status = POSSIBLY)
7.           info.next(doc : left.start( ))
8.           (status, info) <- right.IPO(doc,
                left.start( ), left.end( ))
9.           if status = YES return TRUE
10.      /* status = NO, try next occurrence of left in
            doc */
         left.next(info)
         /** twig does not occur in document doc */
12.  return FALSE
``` b) Documents with Non-Nested Annotation Spans

Figure 5A:
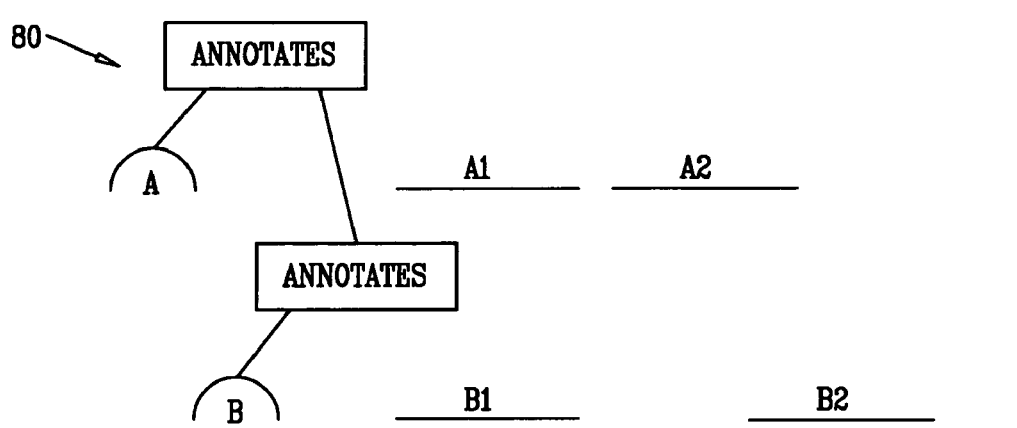
FIGS. 5A-5C are plots that schematically illustrate occurrences of overlapping annotations, which are evaluated in accordance with an embodiment of the present invention.
Figure 5B:
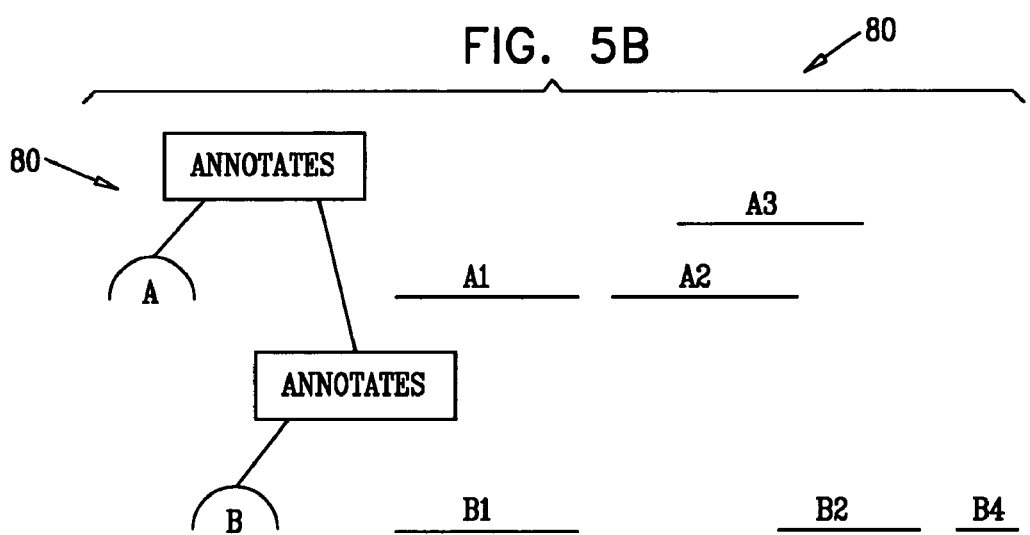
Figure 5C:
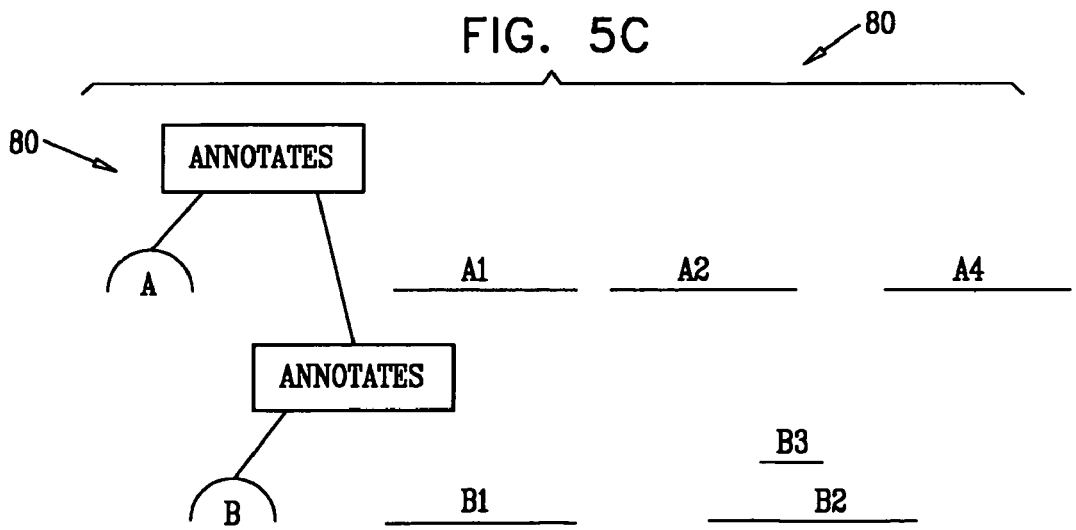

FIGS. 5A-5C are graphs 80 that schematically illustrate possible occurrences of overlapping annotations in a document that is analyzed by processor 25 in accordance with an embodiment of the present invention. The graphs represent the simple twig query "<a> <b/> </a>", evaluated against documents that include overlapping annotations of types a and b. It is assumed that a1 and b1 are the first annotations of each type in the document, followed by a2 and b2, and so forth. The difficulties engendered by these possible overlap modes are resolved by certain changes to the method ANNOTATES::IPO, which are presented below in Listing VIII.

The difficulties in using the methods listed above are illustrated by the example shown in FIG. 5A. In determining whether a candidate document satisfies the positional constraints of the twig query, processor 25 starts FirstTwigInDoc( ) when the iterator of tag a, I(a), reads occurrence a1, and the iterator of tag b, I(b), reads b1. At line 4 of Listing VII, the processor invokes ANNOTATES::IPO of tag b with the end points of a1, which returns POSSIBLY. Hence, at line 6, I(b) advances to b2. Then, at line 7, ANNOTATES::IPO of tag b is invoked again with the end points of a1. This time it returns NO, and hence, at line 9, I(a) advances to a2. At line 4, ANNOTATES::IPO of tag b is invoked with the end points of a2, which returns POSSIBLY, and hence I(b) advances.

Now we assume that the annotations in the rest of the document occur as in FIG. 5B. In this case I(b) now reads b4. At any time later, when I(a) advances to a3, it will not be able to discover that it missed the match with b2. Matches will similarly be missed if I(b) advances to b4 before I(a) reads a3 in the scenario of FIG. 5B, or if I(a) reads a4 before I(b) reads b3 in the scenario of FIG. 5C.

In the object-oriented framework described above, ANNOTATES::IPO (from, to) may be modified in the manner shown below in Listing VIII so that the ANNOTATES nodes efficiently maintain occurrences of annotation spans in a way that enables processor 25 to detect annotation occurrences that are overlapping but non-nested. Each ANNOTATES node n in the query twig maintains a list of occurrences of the left child of n (annotation a) that are useful and still relevant to satisfying the query. Each occurrence o=(start, end) of a, encountered when n.IPO(from, to) is invoked with from≦start<to<end, is added to the list of n. o ceases to be relevant and is dropped from the list when n.IPO(from, to) is invoked with from>start.

In between, while the occurrence is on the list, it causes the method n.IPO(from, to) to return YES if the method is invoked with from≦start and end≦to.

All other routines, including FirstTwigInDoc( ), remain unchanged.

---
LISTING VIII - IPO FOR ANNOTATES IN DOCUMENTS WITH NON-NESTED ANNOTATION SPANS
---

```
1.   (status, info) ANNOTATES::IPO(from, to)
2.   /* left and right are the left and right children of
        this ANNOTATES node */
3.   remove from list all members (start, end) with start
        < from
4.   if list includes a member (start, end) with from ≦
        start and end ≦ to return (YES, N/A)
5.   (status_l, info_l) <- left.IPO(from, to)
6.   if status_l = NO return (NO, info_l)
7.   /* left.start( ) ≦ to */
8.   if left.start( ) < from return (POSSIBLY, left)
9.   /* left.start( ) ≧ from */
10.  /* either status_l = YES or status_l = POSSIBLY and
        left.end( ) > to */
11.  (status_r, info_r) <- right.IPO(left.start( ),
        left.end( ))
12.  if status_r = YES
13.      if status_l = YES return (YES, N/A)
14.      /* encountered a useful crossing over occurrence
            */
15.      add (left.start( ), left.end( )) to list
16.      return (POSSIBLY, left)
17.  if status_r = NO return (POSSIBLY, left)
18.  /* status_r = POSSIBLY */
19.  return (POSSIBLY, info_r)
```

Finding All Occurrences of a Twig in a Candidate Document

The techniques described above may be used to find all the occurrences of a twig pattern in an annotated document, even if not all of the annotation spans are nested.

In one such embodiment, processor 25 enumerates all occurrences of the root of the twig in the document that are part of a twig occurrence. If a single occurrence of the twig root yields more than one twig occurrence in the document (by different positioning of the other twig nodes), processor 25 still counts only a single occurrence of the twig. This embodiment is implemented by changing line 8 in FirstTwigInDoc( ) (Listing VII) so that instead of just returning TRUE, the processor also adds the current occurrence of left to the enumeration.

In another embodiment, processor 25 enumerates all the occurrences of any specified node n of the twig that are part of a twig occurrence. This node is referred to as the "target element." For this purpose, the methods described above are modified so that the ANNOTATES node specified as the target element and all the ANNOTATES nodes on the path from the target element to the root of the twig first identify all the occurrences of the sub-twig that they root in a range (from, to) that they receive. As a result, the target element will step through all of its own occurrences that are a part of a twig occurrence, but may also pick up spurious occurrences that are part of a sub-twig but not the whole twig. In order to filter out these spurious occurrences, the target element reports the occurrences up the twig, and the parent nodes then filter out the spurious occurrences that do not match their own spans. The twig root outputs only those occurrences of the target element that were approved by all the ANNOTATES nodes between the target element and the root.

In yet another embodiment, all twig occurrences can be derived by recursively computing Cartesian products between all occurrences of the sub-twig rooted by the right child of each ANNOTATES node and all the occurrences of the annotation represented by the left child that include that sub-twig.

Although the methods described above relate specifically to occurrences of words within specified spans in documents, these methods may be extended to relate to attributes of elements or annotations. For example, XPath permits attribute constraints to be specified, such as //title [@lang='eng'], which specifies that element "title" should be attributed with attribute name "lang" whose value is "eng". By the same token, the methods described above may be modified to treat attribute names and attribute values in analogy with annotations and text. Fields in the payload of index 32 may be used to associate the attributes with their annotations or XML elements.

As another option, the methods described above may be modified to handle "relational annotations," which combine a few elements or annotations into one super-annotation that is not associated with a contiguous segment of a document. In this case, segments of the document that appear between the combined annotations, but do not belong to any of them, are not said to be annotated by the super-annotation. To deal with situations of this sort in the framework described above, the super-annotation would specify its combined annotations by their ordinal numbers within the document, and the endpoints received by the IPO methods would be specified in the same manner.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A computer-implemented method for searching a corpus of documents, the method comprising:
   defining a query as a twig comprising a root annotation operator having an associated tag specifying a span and having an associated expression indicative of one or more terms whose occurrence within the span will satisfy the query;
   recursively selecting an object from a group of objects that consists of the tag and the expression, and advancing through the corpus using the selected object until a candidate document is found that contains the tag and satisfies the expression;
   evaluating the candidate document to determine whether the one or more terms indicated by the expression occur within the span in the candidate document so as to satisfy the annotation operator; and
   retrieving the candidate document from the corpus upon determining that the annotation operator is satisfied.

2. The method according to claim 1, wherein the one or more terms comprise at least two terms, and wherein the expression comprises an intermediate operator that defines a relation between the terms.

3. The method according to claim 2, wherein the tag associated with the root annotation operator is a first tag, which specifies a first span, and wherein the intermediate operator comprises a intermediate annotation operator with which a second tag, specifying a second span, is associated.

4. The method according to claim 3, wherein evaluating the candidate document comprises determining the root annotation operator to be satisfied when the intermediate annotation operator is satisfied with respect to the second span, while the second span overlaps the first span but is not nested within the first span.

5. The method according to claim 3, wherein evaluating the candidate document comprises finding multiple occurrences of the second span that overlap the first span at least partially and in which the first annotation operator is satisfied.

6. The method according to claim 1, wherein advancing through the corpus comprises creating an index of tags and words occurring in the documents in the corpus, and using the index to find the candidate documents.

7. The method according to claim 6, wherein creating the index comprises annotating the documents with the tags so as to define respective spans of the tags, wherein the respective spans comprise at least first and second spans having an overlap therebetween, while neither of the first and second spans is nested within the other of the first and second spans, and wherein evaluating the candidate document comprises determining that the annotation operator is satisfied by overlap of the first and second spans.

8. Apparatus for searching a corpus of documents, the apparatus comprising:
   an interface, for receiving a query that is defined as a twig comprising a root annotation operator having an associated tag specifying a span and having an associated expression indicative of one or more terms whose occurrence within the span will satisfy the query; and
   a processor, which is configured to process the query by recursively selecting an object from a group of objects that consists of the tag and the expression, and advancing through the corpus using the selected object until a candidate document is found that contains the tag and satisfies the expression, and evaluating the candidate document to determine whether the one or more terms indicated by the expression occur within the span in the candidate document so as to satisfy the annotation operator, and to retrieve the candidate document from the corpus upon determining that the annotation operator is satisfied.

9. The apparatus according to claim 8, wherein the one or more terms comprise at least two terms, and wherein the expression comprises an intermediate operator that defines a relation between the terms.

10. The apparatus according to claim 9, wherein the tag associated with the root annotation operator is a first tag, which specifies a first span, and wherein the intermediate operator comprises a intermediate annotation operator with which a second tag, specifying a second span, is associated.

11. The apparatus according to claim 10, wherein the processor is configured to determine the root annotation operator to be satisfied when the intermediate annotation operator is satisfied with respect to the second span, while the second span overlaps the first span but is not nested within the first span.

12. The apparatus according to claim 10, wherein the processor is configured to find multiple occurrences of the second span that overlap the first span at least partially and in which the first annotation operator is satisfied.

13. The apparatus according to claim 8, wherein the processor is configured to use an index of tags and words occurring in the documents in the corpus in order to find the candidate documents, wherein the documents are annotated with the tags so as to define respective spans of the tags, wherein the respective spans comprise at least first and second spans having an overlap therebetween, while neither of the first and second spans is nested within the other of the first and second spans, and wherein the processor is configured to determine that the annotation operator is satisfied by overlap of the first and second spans.

14. A computer software product for searching a corpus of documents, the product comprising a computer-readable medium in which program instructions are stored, which instructions, when read by a computer, cause the computer to receive a query that is defined as a twig comprising a root annotation operator having an associated tag specifying a span and having an associated expression indicative of one or more terms whose occurrence within the span will satisfy the query, and to process the query by recursively selecting an object from a group of objects that consists of the tag and the expression, and advancing through the corpus using the selected object until a candidate document is found that contains the tag and satisfies the expression, and evaluating the candidate document to determine whether the one or more terms indicated by the expression occur within the span in the candidate document so as to satisfy the annotation operator, and to retrieve the candidate document from the corpus upon determining that the annotation operator is satisfied.

15. The product according to claim 14, wherein the one or more terms comprise at least two terms, and wherein the expression comprises an intermediate operator that defines a relation between the terms.

16. The product according to claim 15, wherein the tag associated with the root annotation operator is a first tag, which specifies a first span, and wherein the intermediate operator comprises a intermediate annotation operator with which a second tag, specifying a second span, is associated.

17. The product according to claim 16, wherein the instructions cause the computer to determine the root annotation operator to be satisfied when the intermediate annotation operator is satisfied with respect to the second span, while the second span overlaps the first span but is not nested within the first span.

18. The product according to claim 16, wherein the instructions cause the computer to find multiple occurrences of the second span that overlap the first span at least partially and in which the first annotation operator is satisfied.

19. The product according to claim 14, wherein the instructions cause the computer to use an index of tags and words occurring in the documents in the corpus in order to find the candidate documents.

20. The product according to claim 19, wherein the documents are annotated with the tags so as to define respective spans of the tags, wherein the respective spans comprise at least first and second spans having an overlap therebetween, while neither of the first and second spans is nested within the other of the first and second spans, and wherein the instructions cause the computer to determine that the annotation operator is satisfied by overlap of the first and second spans.

* * * * *